Figure 1:
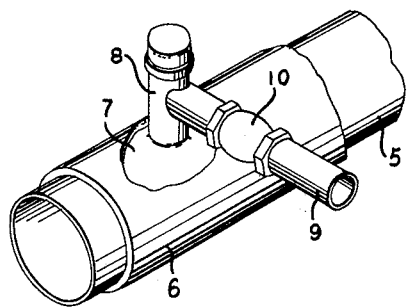

April 13, 1965 A. T. FLOWER ETAL 3,177,528
MOLD FOR APPLYING ELECTRICALLY INSULATED
COATING TO PIPE FITTINGS
Filed May 9, 1963 2 Sheets-Sheet 1

INVENTOR
Archibald T. Flower,
Paul Ganser
& David L. Buchanan
BY Ralph Burch
ATTORNEY

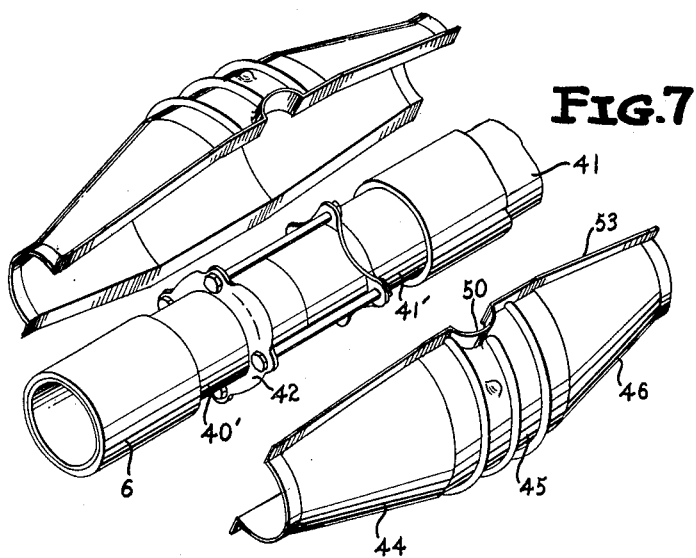
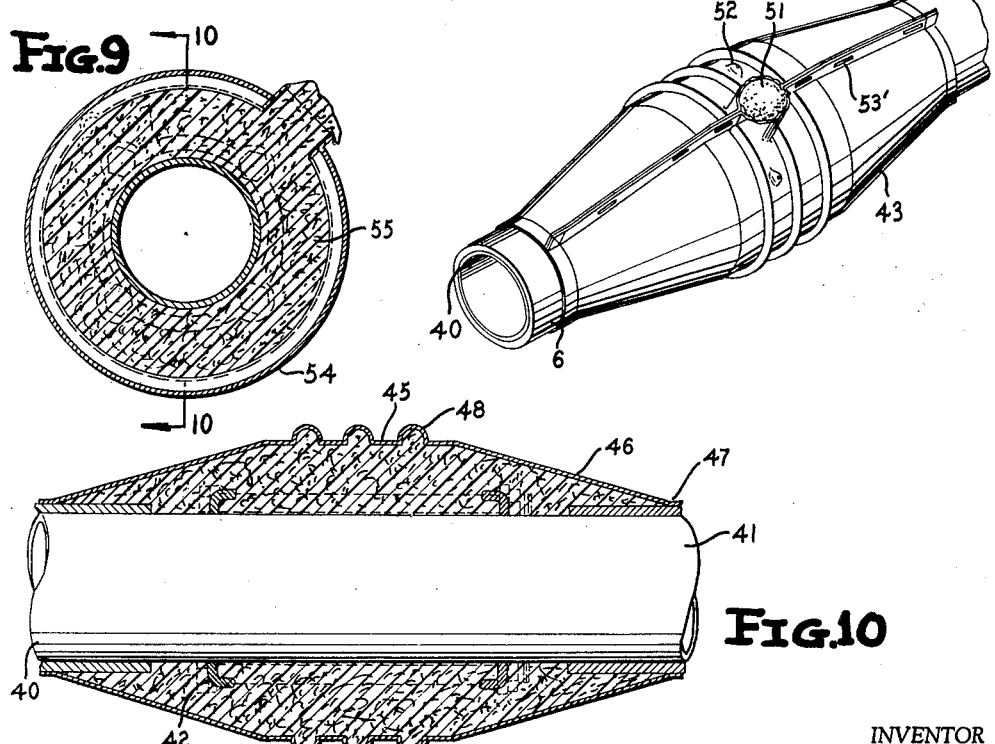

United States Patent Office 3,177,528
Patented Apr. 13, 1965

3,177,528
MOLD FOR APPLYING ELECTRICALLY INSU-
LATED COATING TO PIPE FITTINGS
Archibald T. Flower, 2637 Church Road, Glenside, Pa.;
Paul Ganser, 108 W. Clearfield Road, Havertown, Pa.;
and David L. Buchanan, 6333 Valley Green Road,
Flourtown, Pa.
Filed May 9, 1963, Ser. No. 279,089
5 Claims. (Cl. 18—36)

This invention relates to a mold for applying electrically insulated coating to pipe fittings to prevent the corrosion of underground piping.

In the past few years increasing recognition has been given to the great savings in maintenance expense that can be realized by preventing soil corrosion of underground pipe. Probably the most effective preventive of such corrosion is a durable electrically insulating external coating which is impervious to moisture and will withstand handling during installation and subsequent soil pressure. A number of coatings are available which meet these requirements when factory applied under controlled conditions on lengths of pipe. These lengths of coated pipe are transported to the field and are there welded or otherwise joined together or connected to various fittings such as L's, T's, valves and the like.

Presently available coatings which perform satisfactorily when factory applied to pipe have not proved successful for making field joints or for field application to fittings because application conditions cannot be controlled in the field nor can ditches be left open for the extended periods sometimes required for cure or set. This applies also to tape wrappings, some of which have been satisfactorily applied under factory conditions, but as far as is known none have proved successful when applied to irregular structures in the field.

Applying an expendable mold about the joint or irregularly shaped fitting in the field and pouring in hot-applied asphalt or coal-tar enamels has been successfully employed, but this process is time consuming and has the further disadvantages of high temperature hazards to personnel and the factory-applied coating on the adjacent pipe, emanation of toxic fumes, deleterious effect on the elastic seal of compression type pipe couplings, and the probability of requiring more than one pour to fill the mold because of shrinkage upon cooling.

It is an object of this invention to provide an effective insulating coating for joints, pipe fittings and the like which is relatively inexpensive, can be applied in a few minutes, and may immediately be covered over with soil without risk of reducing effectiveness.

Another object of the invention is to provide an expendable inexpensive semi-rigid transparent plastic envelope conforming to and suitably spaced from the object which is desired to be coated and which is adapted to be filled with rigid unicellular polyurethane foam.

A still further object is to produce a very light and thin transparent plastic mold which has mating portions adapted to be disposed around an object to be coated and then to have the mating edges fastened together at spaced intervals.

Another object of the invention is to provide a thin plastic mold having mating portions adapted to be disposed around an object to be coated and to engage each other along flat edges and then to have these edges stapled together at spaced intervals.

Still another object is to provide a disposable transparent plastic mold stiffened by corrugations, which may be easily applied in the field about a pipe fitting, for coating the pipe fitting with rigid polyurethane foam.

Other objects and advantages of the invention will be apparent during the course of the following description.

Figure 2:
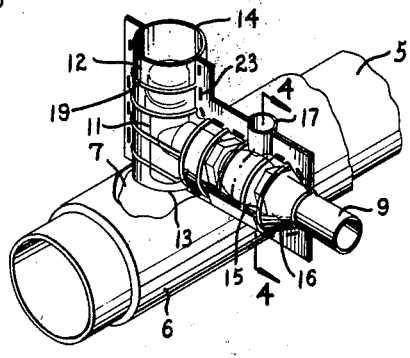
Figure 3:
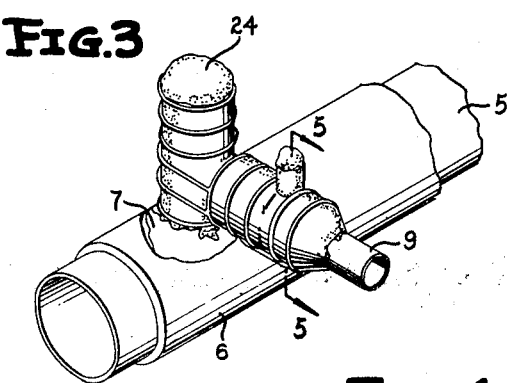
Figure 4:
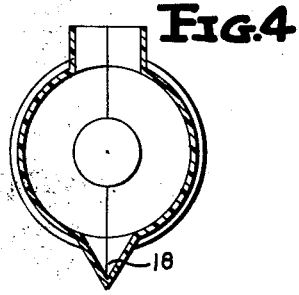
Figure 6:
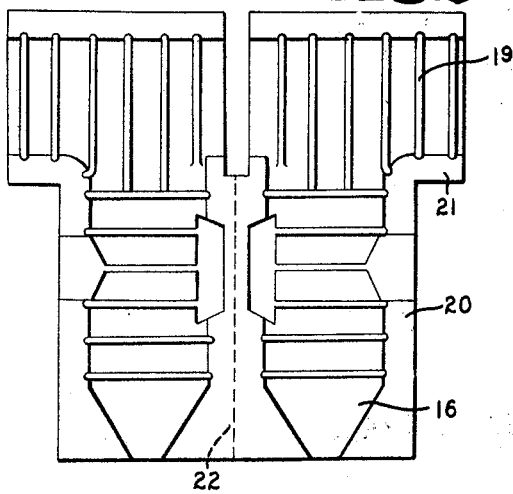
Figure 5:
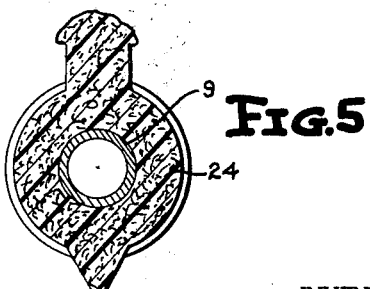

In the accompanying drawings, forming a part of this specification and in which like numerals are employed to designate like parts throughout the same, FIG. 1 is a fragmentary perspective view of a service connection to a coated gas main, FIG. 2 is a perspective view of the envelope applied to the service connection shown in FIG. 1, FIG. 3 is view similar to FIG. 2 showing the molded plastic foam after the envelope is removed, FIG. 4 is a section taken on line 4—4 of FIG. 2, FIG. 5 is a section taken on line 5—5 of FIG. 3, FIG. 6 is a plan view of the plastic envelope before application to the service connection of FIG. 1, FIG. 7 is a perspective view of a modified form of the envelope for application to a pipe joint, FIG. 8 is a perspective view of the envelope applied to a pipe joint, FIG. 9 is a cross sectional view of the envelope and pipe joint after the envelope is filled with plastic foam, and FIG. 10 is a longitudinal sectional view taken on line 10—10 of FIG. 9.

Referring to the drawing, FIG. 1 shows a gas main 5 having a coating 6, a portion of which has been removed, as at 7, to expose the gas main for welding a service T 8 thereto. A service pipe 9 is connected to the T 8 by a compression-type coupling 10. A mold 11, to be later filled with rigid plastic foam, as subsequently to be described, is applied about the service T 8 and coupling 10, as shown in FIG. 2, and is of such size and shape to provide a substantial space which may be about two inches in thickness between the mold and the various surfaces enclosed therein.

At one end of the mold 11 is a transverse cylindrical portion 12, open at each end, which is disposed with its axis vertical surrounding the T 8. The lower end 13 of the portion 12 rests on the main at 7 where the coating 6 has been removed, or on the adjacent coating. The upper end 14 of the portion 12, above the T 8, provides a vent for overflow of the foam material. The mold 11 has a longitudinal main cylindrical portion 15 which intersects and communicates with the end portion 12 and surrounds the coupling 10 and a portion of the pipe 9.

At its end remote from the portion 12, the longitudinal portion 15 connects to a conical mold portion 16 which tapers down to a loose fit on the pipe 9 at the end of the mold 11. At approximately the midpoint of the portion 15, a vertical cylindrical portion 17 intersects the top and communicates with the interior of the portion 15 and opens upwardly to provide a fill and vent opening. At the bottom of the portion 15 below the fill portion 17 is a pocket or well 18 for accumulating the liquid mixture which generates the plastic foam.

The mold 22, shown in developed or unfolded form in FIG. 6 is conventionally vacuum formed in the foregoing described shape from a thin sheet of any suitably transparent or semitransparent tough thermoplastic material such as polyvinyl chloride, linear polyethylene, polypropylene, polystyrene, cellulose acetate butyrate and acrylic resins, or polymers thereof. The thickness of the sheet material used may suitably be in the range 0.01 to 0.05 inch, depending on the size of the mold, the heavier material being used for the larger molds.

A number of arcuate corrugations or ribs 19 are formed in the curved surfaces of the mold to provide desired stiffness and dimensional stability. The flat longitudinal edges 20 and transverse edges 21 constitute fins which are respectively engaged for closing the mold. The unfolded mold 11 shown in FIG. 6 is folded along the longitudinal median, shown as the dotted line 22, enclosing the T and coupling assembly, as illustrated in FIG. 2. Staples 23, suitably spaced about 2 to 3 inches apart, are then applied to fasten together the respective fins 20 and 21, and the flat portions of the mold adjacent the fold 22, with the areas between adjacent stapes being only in casual engagement. This provides a loose closure which permits the escape of air or the foam blowing agent through separation of adjacent surfaces between staples, but prevents appreciable loss of the foam which is of such consistency as to immediately clog these small gaps.

The lower end 13 of mold portion 12 may then be taped to the adjacent coating 6 by means of any suitable adhesive tape which may be cellophane tape, pressure-sensitive plastic tape, friction tape, or the like. This taping is for the purpose of preventing too much of the foam escaping from around the lower end 13 when a large opening exists at this point due to an excess amount of the coating 6 having been broken away at 7 for welding on of the T 8. When the fit of the lower end 13 with the coating 6 is such as to leave only minor openings, it is not necessary to tape up such openings. Similarly as in the case of the loose seams formed by stapling the fins 20 and 21, the taping around the lower end 13 to close any gaps need be only sufficient to reduce the gaps enough to prevent more than a slight outflow of the foam while still permitting escape of gas.

A suitable conventional liquid two-part foamed-in-place polyol-isocyanate resin system, which foams spontaneously to produce an electrically insulating rigid unicellular plastic foam, is poured into the fill portion 17. It is to be understood that the term "unicellular" refers to the property of the cells being non-intercommunicating and the foam being therefore non-porous.

The resin system contains a blowing agent and typically comprises two liquids, a resin primer phase and a so-called prepolymer phase which when mixed together in a very short time begin to produce the foam. The resin premix phase may comprise a polyether mixed with a blowing agent, for example a fluorocarbon such as trichloromono fluoromethane. The prepolymer phase may comprise a suitable diisocyanate which has been partially reacted with a polyol but which still contains unreacted diisocyanate, and may also contain the blowing agent. The composition may be suitably designed to begin foaming action in from about 15 seconds to 1½ minutes after mixing the two phases.

Suitable amounts of the two phases are thoroughly mixed and then immediately poured into the fill portion 17. The liquid mixture drains downwardly into and accumulates in the well 18 which has a capacity adequate to contain somewhat more than enough reactant material to fill the mold with foam after it has reacted. Almost immediately after the liquid reactant material reaches the well 18 it begins to foam very rapidly, and under pressure of the blowing agent violently froths up and fills the mold with foam 24 which expands outwardly and through all openings.

Small openings such as those along the seams of the mold between the staples 23 and other minor openings become plugged with the foam almost instantly after escape therethrough of the blowing agent. The general distribution and large number of these small openings provide assurance against the gaseous blowing agent being pocketed in the mold and preventing complete filling thereof with the foam. The excess foam froths up through the fill portion 17 and the upper end 14. If after filling the portion 17 its external opening is blocked as by the hand, all the excess foam issues from the upper end 14 and may be cut or sawed off and discarded.

A large opening such as the fill portion 17 or the upper end 14 is essential for providing pressure relief of the internal pressure developed by release of the flowing agent in excess of that required to fill the mold with the foam. The optimum size of this large opening depends on the size of the mold, but suitably should be not less than about 2 inches in diameter in any case. After the small openings are sealed off the large opening acts as a relief valve to prevent tearing out of the staples or other disruption of the mold by such excess internal pressure.

The ribs 19 provide the requisite stiffness and rigidity to prevent distortion of the mold during the foaming action, but also contribute substantially to the compressive strength of the mold and foam assembly about the pipe to resist soil pressures when buried in the earth.

Should the foam fail to fill the mold 11, the voids left therein are readily apparent through the transparent or semitransparent material of the mold, since when viewed from the outside there is a pronounced difference in appearance of the foam when it is in contact with the inner surface of the mold than when it is spaced therefrom. The voids resulting from failure of the foam to completely fill the mold practically always occur at or near the top of the mold where they are easily observed. An incision may readily be made in the relatively thin wall of the mold with a knife or other sharp tool at the location of a void. In this opening is poured a small quantity of the liquid foaming material which then foams up and fills the void.

FIGS. 7 to 10 show a modification of our invention adapted to enclose and insulate a pipe point. It is conventional practice to cut back the insulation for several inches from the pipe ends for convenience in welding or otherwise joining the pipe as by a compression coupling. To provide corrosion protection at this joint it is necessary to supply a protective coating on the coupling and the adjacent bare portions of the pipe where the factory-applied coating has been cut back. Referring to FIG. 7, two pipes 40 and 41, having applied thereon the coating 6 which has been cut back from the joined ends at 40' and 41', are joined by a compression coupling 42. As illustrated in FIG. 8, a mold 43, similar to the mold 11, is applied about the joint and a portion of the coating 6 on each side.

The mold 43, instead of being formed in one piece like the mold 11, comprises an assembly of a plurality of separate parts, which may be two identical halves 44, as illustrated. As shown in FIG. 7, each mold half 44 comprises a semicylindrical medial portion 45 having concentric semiconical endwardly converging end portions 46 terminating in semicylindrical collars 47 sized to conform loosely over the coated pipe.

The portion 45 is provided with circumferential ribs 48 molded therein, similar to the ribs 19, to provide stiffness and strength. A semicylindrical collar 50 intersects the portion 44 medially in such manner that its axis is transverse to the plane of the longitudinal edges of the portion 44 and communicates with the interior thereof. When the two halves 44 are assembled as in FIG. 8, the respective collars 50 are in register to provide a fill opening 51. Between the adjacent pair of the ribs 48, each half 44 is provided with an outwardly projecting flat-surfaced blister 52 which is positioned circumferentially off-centered nearer to the collar 47, and may suitably be distant about one-third the circumference from the nearer edge.

The lateral edges of the portions 46 and 46 are provided with radial perimetric fins 53. When the two halves 44 are assembled about the joint, the respective fins 53 are engaged along their entire lengths and are fastened together with spaced staples 53' similarly as in the mold 11.

The mold 43 when applied to the pipe is disposed with the plane of the fins 53 oriented at an acute angle to the vertical such that the underside seam of the engaged fins is offset to one side of the bottom to provide a well 54 for retention of the liquid reactant material 55 when poured in the fill opening 51. As illustrated in FIG. 9 the angle of the plane of the fin seams with the vertical is made such as to have the well 54 adequate to hold an amount of reactant material somewhat in excess of that required to fill the mold with foam after it has reacted and at the same time to position one of the blisters 52 approximately at the top of the mold. Previous to pouring in the liquid reactant material, this top blister is cut open to permit escape of air and blowing agent during foaming and prevent occurrence of a void in the foam at the top of the mold.

Similarly as in the use of the mold 23, as previously described, the mold 43 is assembled about a pipe joint and the respective engaged fins 53 are stapled together at suitable spaced intervals. The mold is then rotated to approximately the position shown in FIG. 9, the top blister 52 is perforated, and a suitable amount of the liquid reactant material is poured into the fill opening 51. The reactant material then froths up and fills the mold with foam similarly as described for the mold 11, with foam overflowing through the opening 51 to relieve excessive pressure.

The wells 18 and 54 have the advantage of collecting the liquid resin system in a pocket rather than permitting it to spread out, thus confining the exothermic reaction within a smaller area resulting in attainment of a higher temperature which accelerates the foaming action.

When for the purposes of shut-off, repair, replacement or other reason, it is desired to obtain access to fittings which have been encased in mold-applied asphalt or coal-tar enamels, removal of such material is difficult and time consuming. In contradistinction, our coating is very easily and rapidly removable since both the mold and the foam are readily cut with a knife or other sharp tool.

Our mold and the contained rigid unicellular polyurethane foam together provide an almost ideal corrosion preventive coating which has the outstanding advantages inherent in the polyurethane foam of tenacious adhesion to bare metals and conventional pipe coating materials, ready removability with a sharp tool, and imperviousness to penetration, solution, or chemical attack by soil waters, while our relatively inexpensive plastic mold contributes ease, rapidity and effectiveness of application, reinforcement to withstand soil pressure, and its transparency provides assurance of elimination of voids.

Having thus described our invention, we claim:

1. A plastic mold for use in coating an uninsulated part of a pipe line, comprising a preformed body of thin relatively transparent plastic material shaped to conform generally with and to be substantially spaced from the part to be coated and having a tapered end for loosely engaging a portion of the pipe, transverse reinforcing corrugations in said body, flat perimetral fins on the marginal edges of said mold, fastening means applied to said fins for securing the mold about the part to be coated, and channel means on said body for pouring into said mold a liquid foamed-in-place polyol-isocyanate resin system.

2. The invention described in claim 1 wherein said body is formed from sheet material and is foldable on a medial line to enclose the part to be coated and shaped adjacent said medial line to provide when folded a well for retaining said liquid resin.

3. In a pipe line having a corrosion protective external coating and uncoated parts, a preformed body of thin relatively transparent plastic material enclosing uncoated parts of said pipeline and shaped to conform with and to be substantially spaced from the enclosed part, a tapered end on said body loosely engaging a portion of the pipe, said body having formed therein circumferential reinforcing corrugations, a medially disposed bottom well and a top fill opening disposed above said well for pouring into said well a liquid foamed-in-place polyol-isocyanate resin system.

4. A mold for use in coating an uninsulated joint of a pipe line having a previously applied coating thereon except adjacent said joint, comprising a plurality of preformed bodies of thin relatively transparent plastic material each shaped to conform generally with and to be substantially spaced from a segment of the part to be coated and having flat radial fins along its longitudinal edges, said bodies when assembled about said joint with the longitudinal edges in engagement and respective fins in registering abutment forming an enclosure having a cylindrical medial portion and conical end portions loosely engageable over the previously applied coating at the respective adjacent ends, said medial portion having circumferential reinforcing corrugations formed therein, and two of said engaged edges being recessed to provide a fill opening for said mold.

5. A mold as described in claim 4 wherein said medial portion has formed therein between adjacent corrugations an outwardly protruding thin-surfaced blister and said mold is concentrically disposed about said joint with said conical end portions loosely engaging the adjacent coated ends, said registering fins are fastened together with spaced staples, said mold is transversely rotationally oriented such that none of said engaged edges is at the bottom whereby a bottom well is constituted in said medial portion, said fill opening is disposed generally above said well, and laterally displaced from the vertical diameter of said mold, and said blister is disposed substantially at the top of said mold.

References Cited by the Examiner

UNITED STATES PATENTS

| | | | |
|---|---|---|---|
| 915,698 | 3/09 | Putz | 25—127 |
| 1,715,942 | 6/29 | Morgan | 25—127 |
| 2,433,211 | 12/47 | Gitts | 18—47 XR |
| 2,576,712 | 11/51 | Boyko | 18—47 XR |
| 2,668,344 | 2/54 | Killian et al. | 25—127 |
| 2,681,495 | 6/54 | Killian et al. | 25—127 |
| 2,744,042 | 5/56 | Pace | 18—59 |
| 2,794,483 | 6/57 | Hopkins | 18—34 |
| 2,877,503 | 3/59 | Puderbaugh et al. | 18—59 |
| 2,979,779 | 4/61 | Stack. | |
| 3,013,922 | 12/61 | Fisher | 18—59 |
| 3,014,614 | 12/61 | Carroll et al. | 18—47 XR |
| 3,028,002 | 4/62 | Nicholle. | |
| 3,059,279 | 10/62 | Rossi | 18—34 |
| 3,145,421 | 8/64 | Colbert | 18—36 |

FOREIGN PATENTS 804,684  11/58  Great Britain.

WILLIAM J. STEPHENSON, *Primary Examiner.*